May 24, 1966 T. M. RANDALL 3,253,155

BINARY SIGNAL DISCRIMINATOR USING A STROBED INTEGRATOR

Filed Dec. 11, 1962 2 Sheets-Sheet 1

INVENTOR
T. M. RANDALL
BY
Charles Scott Phelan
ATTORNEY

BINARY SIGNAL DISCRIMINATOR USING A STROBED INTEGRATOR

Filed Dec. 11, 1962 2 Sheets-Sheet 2

United States Patent Office
3,253,155
Patented May 24, 1966

3,253,155
BINARY SIGNAL DISCRIMINATOR USING A STROBED INTEGRATOR

Theron M. Randall, Middletown, N.J., assignor to Bell Telephone Laboratories, Incorporated, New York, N.Y., a corporation of New York
Filed Dec. 11, 1962, Ser. No. 243,873
6 Claims. (Cl. 307—88.5)

This invention relates to an amplitude discriminating circuit of the type that may be used, for example, in magnetic memory systems to discriminate between binary ONE and ZERO signals that are characterized ideally by signal voltages of different amplitudes.

Signals which appear in the sensing circuit of a magnetic memory system may vary in magnitude and phase as a function of the storage location of the sensed information bit in the magnetic memory. Noise pickup in the sensing circuit from other circuits in the memory, and noise originating from other sources, also have their individual effects upon pulses in the sensing circuit. Consequently, binary ONE and ZERO pulses in such a system do not always produce their individual peak amplitudes at the desired times in an information bit time slot. Accordingly, considerable difficulty is encountered in utilizing conventional pulse peak detecting circuits to discriminate between a binary ONE pulse which should be the larger of the ONE and ZERO signals, and the smaller binary ZERO signal, which is, in fact, considered to be noise. Under conditions approaching the worst possible conditions there are times when the peak of the ZERO noise pulse may be greater than the peak of the binary ONE signal pulse during the signal pulse sampling interval. Accordingly, such a ZERO signal would, in a pulse peak detecting discriminator circuit, appear erroneously as a ONE in the output of the discriminator circuit.

It is therefore one object of the present invention to improve amplitude discriminating systems.

Another object is to increase the reliability of amplitude discriminators operating in the presence of interference such as noise, phase delay, and the like.

A further object is to utilize a hitherto unused characteristic of amplitude coded binary ONE and ZERO signals to increase the margin of discrimination therebetween.

In accordance with one illustrative embodiment of the invention an amplitude discriminator includes, in combination, a strobed integrator circuit and an amplitude-sensitive trigger circuit connected to the output of the integrator circuit. The integrator output signal is a function of the energy content of received binary pulses during the sampling time interval that the integrator is strobed. This output voltage from the integrator is combined with a reference voltage of predetermined magnitude to operate the trigger circuit in response to a binary ONE and to leave the trigger circuit unoperated in response to a binary ZERO.

It is one feature of the invention that the integrator circuit used in the novel combination is responsive to the energy content of received signals rather than the peak amplitude thereof so that the integrator output voltage ratio of ONE voltage to ZERO voltage is much larger than a corresponding output voltage ratio for a simple peak detecting gate.

It is another feature of the invention that the amplitude discriminator of the invention is less sensitive to the duration and occurrence time of the information bit sampling interval, as long as the duration of the sampling time is substantially constant from bit to bit.

Still another feature of the invention is that the time rate of change of a binary ONE voltage pulse over the sampling interval is relatively small and at a high level while the rate of change for a binary ZERO signal over the sampling interval is relatively much higher although the peak amplitude of such ZERO signal voltage is normally at a much lower level than the level of the binary ONE. Accordingly, the discrimination margin between binary ONE and ZERO signals in the output of the strobed integrator circuit is much larger than was heretofore realizable with sampling gates that have been employed in the prior art.

Complete comprehension of the present invention and its various features and advantages may be obtained from the following detailed description, including the appended claims, and the attached drawing in which:

Figure 1:
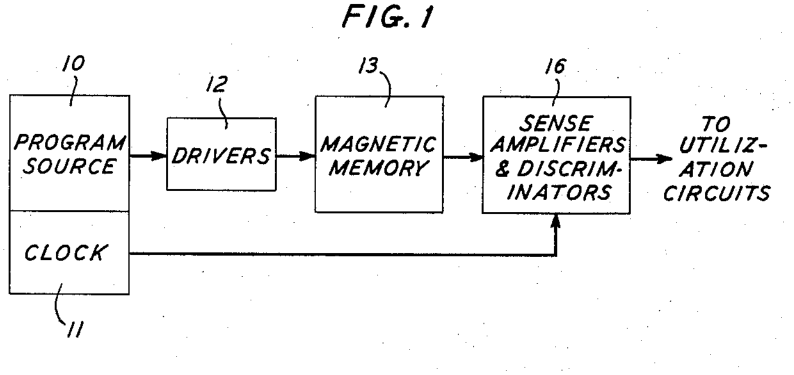
FIG. 1 is a simplified block and line diagram illustrating a magnetic memory system in which the present invention may be employed.

In FIG. 1, a program signal source 10 supplies signals in synchronism with the output of a clock source 11 for operating the system drivers 12. These drivers may include, for example, X and Y coordinate drive sources for supplying coincident read and write signals, an inhibit signal source, and associated access switching means for coupling the output of drivers 12 to the circuits of a magnetic memory 13 in a fashion that is known in the art for actuating selected bistable magnetic storage elements within the memory 13. Signals are produced by the bistable storage elements in memory 13 as they are switched from one portion to another of their hysteresis characteristics. These signals induce corresponding voltages in memory sensing circuits which drive sense amplifiers and discriminators 16. The latter circuits provide to output utilization circuits binary ONE and ZERO signals of predetermined pulse configuration and in synchronism in a predetermined manner with the output of clock source 11.

In spite of the synchronizing influence of clock source 11 upon the drivers 12, there are many variables which can influence the configuration and occurrence time of read-out pulses from the memory 13. For example, in a three-dimensional memory of 1024 multi-digit words the sense lead for a digit plane of the memory must develop a signal representing a single digit, or bit, of a particular selected word in the memory. However, this sense lead also links 1023 other bit locations representing the corresponding digit of each of the other words of the memory. Sixty-two of those 1023 bit locations in the digit plane under consideration may be shuttled by half-select signals while a sixty-third additional bit location is being selected by X and Y drive signals of the memory. These half-select shuttling signals develop considerable noise in the sense circuit of the digit plane as is well known in the art, and that noise alters the shape of the total voltage applied by the sense circuit to the sense amplifiers.

Furthermore, the 1024 bit locations which are linked by the single sense circuit are all at different electrical distances from the sense amplifier for the circuit. For this reason, a binary ONE pulse which is generated at the most remote location in a digit plane under consideration arrives at the input of the sense amplifier after a much greater delay than would the same type of pulse generated at the bit location which is closest to the sense amplifier input connections. Such delay affects the configuration of the signal sample that is seen during a sampling interval controlled by source 11.

Sampling signals under the control of clock source 11 occur at relatively fixed time intervals with respect to a given time base. The peak amplitude of a read-out binary ONE signal pulse from the memory 13 may, however, occur at any instant within a time interval range that is a part of the fixed time base sampling interval because of the delay factor just mentioned. Similarly, the binary ZERO signals which are electrically small, but are actually of a significant amplitude because of the influence of departures from perfect rectangularity in the hysteresis characteristics of the bistable magnetic storage elements, also have signal peaks which may occur at a variety of instants during a signal sampling interval. Thus, if it is desired to sample a binary ONE at the peak thereof, and a binary ZERO at some time other than its peak, elaborate structures must be provided for appropriately controlling the memory drivers and read-out circuits. Such controlling structures must ensure that the binary ONE is always sampled at its peak, the binary ZERO is never sampled at its peak, and the maximum amplitude of the ZERO noise signal is never larger than the minimum binary ONE peak during the forementioned sampling interval.

Figure 2:
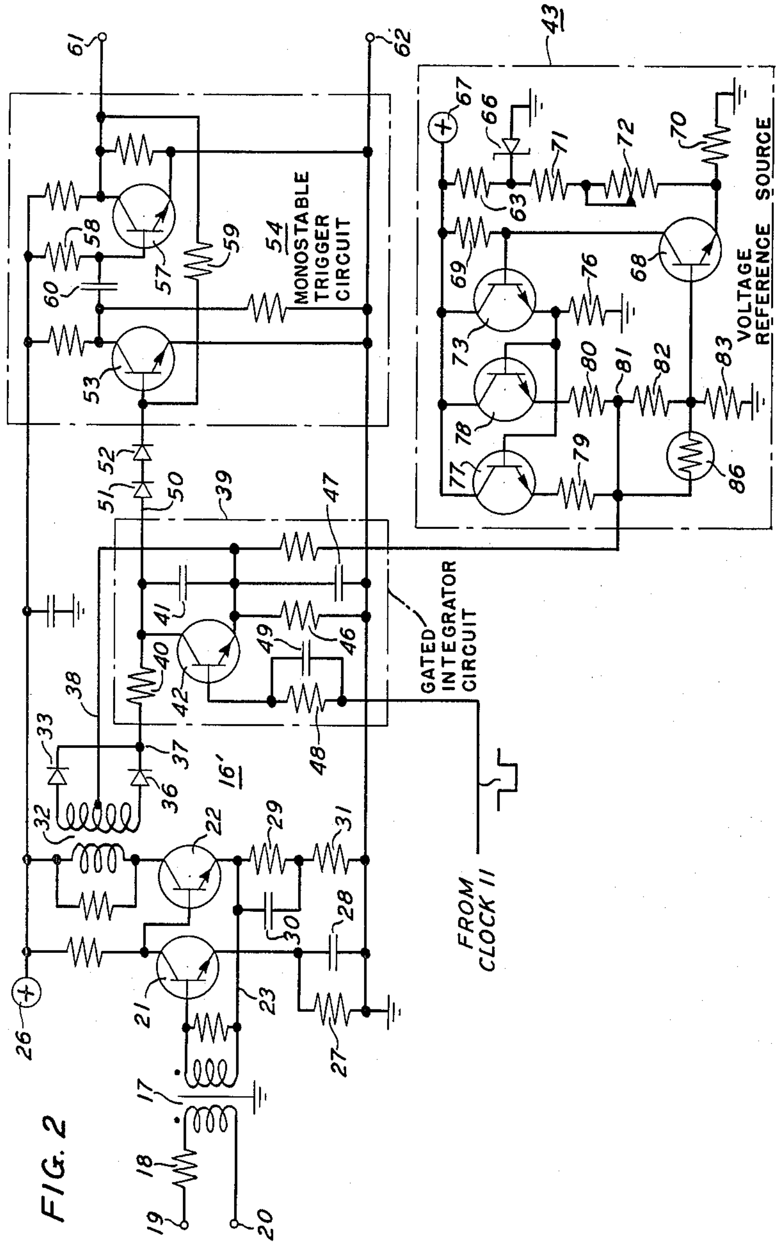
FIG. 2 is a schematic diagram of a sensing amplifier circuit, including a discriminator in accordance with the invention, for use in the system of FIG. 1.

A sensing amplifier in accordance with the present invention is illustrated in FIG. 2 and is adapted to discriminate between binary ONE and ZERO signals having different characteristic peak amplitudes but without relying upon the detection of such peaks during a predetermined sampling interval. The circuit of FIG. 2 depends upon binary signal characteristics other than the characteristic peaks of the signals and accordingly does not require the aforementioned system elaboration for detecting signal peaks. The circuit of FIG. 2 operates on the assumption that over a fairly broad sampling interval, the ONE sense signal is relatively large and unchanging compared to the ZERO sense signal. Accordingly, integration of the ONE and ZERO samples produces voltages that are more easily discriminated and are relatively insensitive to phase and amplitude variations.

A single sense amplifier and discriminator combination is shown in FIG. 2, and it would be duplicated in the sensing circuit for every digit plane of memory 13. A transformer 17 couples to the input of amplifier-discriminator 16′ the signals that are received through a resistor 18 from input terminals 19 and 20. The latter terminals are coupled to a sensing circuit of magnetic memory 13 in FIG. 1. One terminal of a secondary winding of transformer 17 is connected to the base electrode of a transistor 21 that is the first-stage transistor in a two-stage feedback amplifier that also includes a second transistor 22. Signals appearing at the collector electrode of transistor 21 are applied directly to the base electrode of transistor 22 and feedback is provided through a lead 23 from the emitter electrode of transistor 22 to the other terminal of the secondary winding of transformer 17.

Transistors 21 and 22 comprise an amplifier which is linear in the desired range of operation. That range is defined by two amplitude limiting levels which are fixed by the magnitude of a source 26 of operating potential and the resistances in the emitter and collector circuits of transistors 21 and 22. Source 26 is schematically represented by a circled plus sign which indicates any suitable source of potential having its positive terminal connected to the circuit at the circled plus sign and having its negative terminal grounded.

Signals received at terminals 19 and 20 are bipolar in character in that each individual bit signal may be either positive or negative depending upon the portion of memory 13 from which it was derived. The bipolar characteristic arises from the fact that some portions of the sense circuit in memory 13 are reversed with respect to other portions to reduce the effects of certain noises coupled thereto as is now well known in the art. Negative-going pulses at the base of transistor 21 are limited by turn-off of the transistor. The emitter direct potential level, which is established by an emitter resistor 27 with an alternating current bypass capacitor 28 connected in parallel therewith, establishes the transistor turn-off point. A similar resistor 29 and parallel-connected capacitor 30 are connected in the emitter circuit of transistor 22 in series with a resistor 31. Negative-going input pulses develop across the secondary winding of transformer 17 a potential difference which is a function of the input pulse magnitude. If this potential difference, in combination with the potential difference across resistors 29 and 31, is less positive than the potential developed across resistor 27, transistor 21 is biased to a nonconducting condition and transistor 22 is biased to its maximum conducting condition in the illustrated circuit, thereby limiting the negative-going excursions of the amplified input pulses. Similarly, positive-going input pulses may drive transistor 21 only to the point at which the collector electrode thereof is at a potential which is less positive than the potential developed across resistors 29 and 31, and at that point transistor 22 is biased nonconducting to terminate amplification.

The bipolar signals which are amplified and limited at predetermined positive and negative potentials in the manner described are coupled by a transformer 32 in the collector circuit of transistor 22 to a full wave rectifier circuit. The rectifier includes diodes 33 and 36 which connect the terminals of the secondary winding of transformer 32 to a common junction 37. Return signals for the full wave rectifier are supplied via a lead 38 which is connected to a center tap of the secondary winding of transformer 32. Unipolar output pulses from the full wave rectifier appear between junction 37 and lead 38 and are applied to the input of a gated integrator circuit 39. These unipolar pulses may typically have the configuration illustrated in FIG. 3 for superimposed binary ONE and ZERO signals, respectively.

Integrator circuit 39 includes a series-connected resistor 40 and a shunt-connected capacitor 41, the latter being itself shunted by the collector-emitter current path of a transistor 42. This capacitor and resistor are proportioned to integrate voltages at junction 37 over the assigned sampling interval. A reference voltage for the integrator 39 is provided by a temperature tracking voltage reference source 43 which develops such reference voltage across a parallel combination of a resistor 46 and a capacitor 47 that are connected in series with capacitor 41 between resistor 40 and ground.

Control signals are supplied from clock source 11 through the parallel combination of a resistor 48 and a capacitor 49 to the base electrode of transistor 42. These signals are normally at a potential magnitude which is larger than, but of the same polarity as, the aforementioned reference voltage so that transistor 42 is normally conducting in the absence of a negative-going clock pulse. Such clock pulses are adapted in accordance with the invention to occur during the desired information bit sampling intervals, and they bias transistor 42 nonconducting during a large portion of the total bit interval so that capacitor 41 may be charged by current flowing from junction 37 through resistor 40, capacitor 41, lead 38, and the full wave rectifier diodes 33 and 36. In one memory system a sampling interval was advantageously fixed at fifty percent, plus or minus ten percent, of the bit interval.

The charge voltage thus developed across capacitor 41 while transistor 42 is nonconducting combines additively with reference voltage developed across resistor 46 and appears between ground and an output lead 50 of the integrator 39. When the total voltage with respect to ground on lead 50 attains sufficient magnitude to forward bias the series combination of diodes 51 and 52 and the base-emitter junction of a transistor 53 in a monostable trigger circuit 54, the latter circuit is triggered into operation.

Upon the termination of the negative-going clock pulse, transistor 42 conducts once more, thereby providing a low impedance discharge path for capacitor 41 so that lead 50 is returned to the reference potential level developed across resistor 46. This reference level is insufficient to maintain conduction through diodes 51 and 52 and the base-emitter junction of transistor 53, and the input triggering signal to the trigger circuit 54 is thereby terminated.

Figure 3:
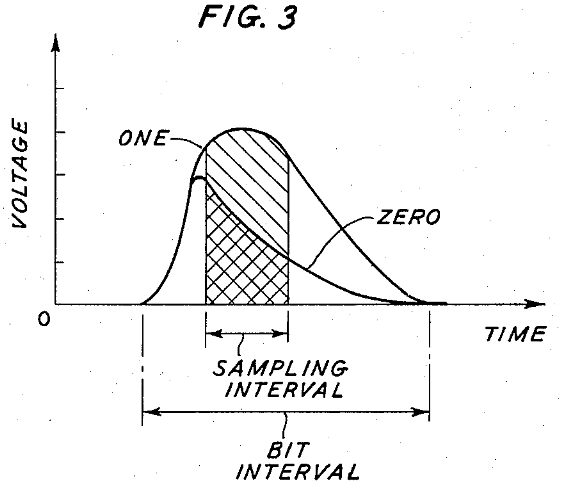
FIG. 3 is a voltage-versus-time diagram illustrating the nature of the operation of the present invention.

The operation of the integrator circuit 39 may also be considered from another viewpoint. The nature of the circuit is such that when transistor 42 is nonconducting, i.e., during the sampling interval, circuit 39 attenuates high frequencies much more than low frequencies. ZERO noise signals and other noise voltages are usually of a rapidly varying character compared to ONE signals, during the sampling interval as illustrated in FIG. 3. Consequently, over the range of frequency components included in ONE signals and noise, there is a band of low frequencies that predominate in ONE signals but are of relatively insignificant magnitude in the noise. Conversely, there is a band of higher frequencies that predominate in the noise and are of relatively insignificant magnitude in ONE signals. Accordingly, resistor 40 and capacitor 41 are selected to produce an attenuation effect upon the mentioned higher band of frequencies which is greater than the attenuation of the lower band of frequencies. However, when transistor 42 is conducting, during nonsampling portions of the bit interval, it discharges capacitor 41 rapidly thereby producing a direct current restoration effect.

Trigger circuit 54 is a conventional monostable multibrator which includes a transistor 57 as well as the transistor 53. Transistor 57 is normally conducting in the absence of input trigger signals as a result of the connection of its base electrode to the positive source 26 through a resistor 58. Consequently, the collector electrode of transistor 57 is approximately at ground potential and this potential is coupled through a feedback resistor 59 to the base electrode of transistor 53, thereby preventing conduction of the latter transistor.

However, upon receiving a triggering signal from integrator 39 as previously described, transistor 53 is biased into conduction and a negative-going signal is coupled from its collector electrode through capacitor 60 to bias negatively the base electrode of transistor 57 and terminate conduction therein. The positive-going pulse at the collector electrode of transistor 57 appears between output terminals 61 and 62 and is also coupled through resistor 59 to drive transistor 53 further toward its saturated condition. This regenerative transfer of conduction continues until transistor 57 is biased completely nonconducting and transistor 53 is conducting in a saturated condition. When capacitor 60 charges sufficiently to permit the restoration of the base electrode of transistor 57 to a positive potential with respect to ground, the conduction is regeneratively transferred from transistor 53 to transistor 57 in the usual manner. Output signals at terminals 61 and 62 may be coupled to the utilization circuits indicated in FIG. 1.

Reference voltage source 43 is a temperature-tracking, regulated source. A resistor 63 and a reverse breakdown diode 66 are connected in series between the terminals of a potential source 67. Diode 66 is the type, sometimes called a Zener diode, which has a relatively stable potential difference thereacross when conducting in the reverse direction, and this potential difference is relatively independent of current level as long as sufficient current is supplied to maintain reverse conduction.

A transistor 68 is connected in series with collector and emitter resistors 69 and 70 between the terminals of source 67. The emitter potential level of transistor 68 is established in large measure by voltage dividing action of resistor 70 and the connection of the emitter electrode of transistor 68 to the cathode of diode 66 by a resistor 71 and a rheostat 72. Conduction in transistor 68 fixes the base potential level, and thus the conduction level, of a transistor 73 which has its collector and emitter electrodes connected in series with a resistor 76 between the terminals of source 67.

Two further transistors 77 and 78 have their collector-base circuits connected between the collector and emitter electrodes of transistor 73 so that the potential difference developed across resistor 76 affects conduction in transistors 77 and 78. Emitter electrodes of transistors 77 and 78 are returned to ground through resistors 79 and 80, respectively, a common junction 81, a resistor 82, and a resistor 83. Transistors 77 and 78 are parallel connected to provide increased current handling capacity; and those transistors, together with transistor 73, comprise a modified Darlington compounding circuit. A thermistor 86 shunts resistor 82 to alter the emitter return circuit resistance in a direction which tends to offset the effect on output voltage at junction 81 of changes in ambient temperature. The base electrode of transistor 68 is connected to the common terminal of resistors 82 and 83 so that its conduction level is also affected by the voltage changes at junction 81 to provide feedback for output voltage regulation as a supplement to the temperature corrections injected by thermistor 86.

The superimposed ONE and ZERO signals in FIG. 3 illustrate perceptually the nature of the operation of the present invention. Cross-hatched areas under the curves represent the sampling interval when integrator 39 is operative. This interval corresponds to the duration of a clock pulse on the base electrode of transistor 42 in FIG. 2 and comprises advantageously about 50 percent of a bit interval. Double cross-hatching in the sampling time interval indicates integrated energy common to both a ONE and a ZERO bit, and single cross-hatching indicates ONE-bit energy in excess of that common to both ONE and ZERO bits. The total cross-hatched area under the ONE curve during the sampling interval is roughly two and one-half times the area under the ZERO curve during the same interval.

The aforementioned area ratio may change somewhat if either the ONE or the ZERO, or both, are shifted in phase with respect to the sampling time interval. It is, however, apparent from FIG. 3 that substantial shifts can take place in the occurrence time relationships among the ONE, ZERO, and sampling intervals without altering the fact that there is a large difference between ONE and ZERO sampling areas. Furthermore, since noise tends to take the form of narrow voltage spikes, such spike noise could coincide with the ZERO peak, either as shown or at the center of the sampling interval, to raise the ZERO peak above the typical ONE peak amplitude without greatly changing the aforementioned area ratio.

On the other hand, a peak-sensitive sampling gate would see a ONE-to-ZERO peak amplitude ratio of about 4-to-3 for the bits shown in FIG. 3. This ratio could well be inverted by the noise spike case just described to give an erroneous output. Of course, the sampling interval could be narrowed to improve the peak amplitude ratio somewhat by looking at the maximum ONE time and, hopefully, a less-than-maximum ZERO time. However, phase differences between occurrence times of bits at the sampling gate input depending upon their location in the memory would again create the situation wherein the minimum ONE may be smaller than the maximum ZERO.

Accordingly, the strobed integrator of the invention is relatively insensitive to signal amplitude variations due to noise and relatively insensitive to variations in the occurrence times of sensed information bits with respect to the strobe, or sampling, time base. This characteristic is at least partially due to the fact that noise voltages, including ZERO signals, usually experience a rapid rate of amplitude change during the sampling interval, and the amplitude changes include a wide range of amplitudes. However, the ONE signals usually experience a relatively slow rate of amplitude change in a narrow range during the sampling interval. Consequently, the integrated ONE and ZERO voltages derived during sampling intervals differ in peak amplitude by a much larger margin than do the peak amplitudes of the ONE and ZERO signal samples without integration. Because of this characteristic, the amplitude discriminator of the invention produces output signals with a lower discriminator error rate than was heretofore possible with simple sampling discriminators without elaborate timing schemes and suppression schemes to insure amplitude and phase stability of sense circuit signals.

Although the present invention has been described in connection with a particular embodiment thereof, it will be understood that the underlying principles of the invention may be incorportaed in other embodiments that will be apparent to those skilled in the art without departing from the spirit and scope of the invention.

What is claimed is:

1. A binary amplitude discriminator circuit comprising
a source of information signals having their amplitudes binary coded to be either greater or less than a predetermined reference magnitude, each of said signals having a predetermined signal bit duration, a trigger circuit adapted to produce an output pulse in response to the application thereto of a predetermined one only of said binary coded signal amplitudes,
an integrating circuit coupling said source to an input of said trigger circuit,
means normally disabling said integrator circuit to prevent operation of said trigger circuit, and
means applying pulses to inhibit said disabling means during a predetermined time interval of each of said signals.

2. The amplitude discriminator in accordance with claim 1 wherein said integrating circuit comprises
a resistor connected in series in the input of said trigger circuit, and a capacitor connected in shunt with respect to said input, and
said disabling means comprises a switch connected to shunt said capacitor in the absence of said inhibiting pulses.

3. The discriminator in accordance with claim 2 wherein said switch is a transistor having base, emitter, and collector electrodes, said collector and emitter electrodes being connected to different terminals of said capacitor, and said transistor having its base electrode connected to said pulse applying means.

4. A discriminator for amplitude-coded digital signals which comprises
a source of clock signals for controlling sampling of said digital signals, a trigger circuit which is normally inactive in the absence of input signals in excess of a predetermined amplitude level corresponding to only one amplitude coded portion of said digital signals,
a normally-inactive, gated integrator for coupling said digital signals to said trigger circuit when activated, and
means coupling said clock signals to activate said integrator.

5. In a pulse amplitude discriminator wherein a clocked sampling circuit extracts samples of digital signals and the samples are applied to an input of a signal-amplitude-sensitive trigger circuit for discriminating between first and second signal amplitude ranges, the improvement which comprises
said sampling circuit including a source of control signals, and
an integrator having a resistor series connected for applying said digital signals to said trigger circuit, a capacitor shunt connected with respect to the input of said trigger circuit, and switching means connected to shunt said capacitor in the absence of said control signals.

6. An amplitude discriminator comprising
means receiving binary-amplitude-coded bipolar pulses, the coding thereof being such that a pulse of either polarity and greater than a first magnitude is designated a binary ONE, and a pulse of either polarity and less than said magnitude is designated a binary ZERO,
means connected to said receiving means for producing unipolar pulses with the same amplitude coding,
a trigger circuit, and
a gated integrator circuit coupling said producing means to said trigger circuit for activating said trigger circuit in response to unipolar pulses representing only one of said binary code designations.

References Cited by the Examiner

UNITED STATES PATENTS

| | | | |
|---|---|---|---|
| 2,834,883 | 5/1958 | Lukoff | 328—151 |
| 2,892,101 | 6/1959 | Bright | 307—88.5 |
| 2,915,632 | 12/1959 | Moore | 328—127 X |
| 3,096,448 | 7/1963 | Stratos | 307—88.5 |
| 3,101,406 | 8/1963 | Engelmann | 328—127 |
| 3,131,258 | 4/1964 | O'Neill | 307—88.5 |
| 3,147,407 | 9/1964 | Warner et al. | 307—88.5 |

ARTHUR GAUSS, *Primary Examiner.*

J. ZAZWORSKY, *Assistant Examiner.*